(12) United States Patent
Kim et al.

(10) Patent No.: US 12,478,523 B2
(45) Date of Patent: Nov. 25, 2025

(54) ARTIFICIAL INTELLIGENCE-BASED ELECTRIC WHEELCHAIR CONTROL METHOD AND DEVICE AND SYSTEM THEREFOR

(71) Applicant: UNITEL ELECTRONICS CO., LTD., Seoul (KR)

(72) Inventors: Jung Won Kim, Gimpo-si (KR); Yu Sung Moon, Incheon (KR)

(73) Assignee: UNITEL ELECTRONICS CO., LTD., Seoul (KR)

( * ) Notice: Subject to any disclaimer, the term of this patent is extended or adjusted under 35 U.S.C. 154(b) by 308 days.

(21) Appl. No.: 18/209,448

(22) Filed: Jun. 13, 2023

(65) Prior Publication Data

US 2024/0415710 A1    Dec. 19, 2024

(51) Int. Cl.
*G01C 21/00* (2006.01)
*A61B 5/117* (2016.01)
(Continued)

(52) U.S. Cl.
CPC ............ *A61G 5/04* (2013.01); *A61B 5/117* (2013.01); *A61G 5/10* (2013.01); *G06F 3/0482* (2013.01);
(Continued)

(58) Field of Classification Search
CPC ........ A61G 5/04; A61G 5/10; A61G 2203/10; A61G 2203/18; A61B 5/117;
(Continued)

(56) References Cited

U.S. PATENT DOCUMENTS

| | | | |
|---|---|---|---|
| 2019/0080532 A1* | 3/2019 | Lee .................... | B60R 25/241 |
| 2020/0077264 A1* | 3/2020 | Studer ................. | H04L 63/105 |

(Continued)

FOREIGN PATENT DOCUMENTS

| | | | | |
|---|---|---|---|---|
| CN | 108776795 A | * | 11/2018 | ............. G10L 17/06 |
| KR | 20080114127 A | * | 12/2008 | ............. A61G 5/041 |

(Continued)

OTHER PUBLICATIONS

Machine Translation of CN-108776795-A (Year: 2018).*
(Continued)

*Primary Examiner* — Sahar Motazedi
(74) *Attorney, Agent, or Firm* — Revolution IP, PLLC

(57) ABSTRACT

An artificial intelligence-based electric wheelchair control method includes performing a booting procedure according to power application to pair with a user device; obtaining user information from a server through the paired user device; determining an operation control mode of an electric wheelchair based on the user information; recognizing a predefined start command through a sensor corresponding to the determined operation control mode when an always-on display (AOD) screen is in an inactive status; activating the inactivated screen according to the start command, outputting a user interface screen for controlling the electric wheelchair on a display device and waiting for a user input signal; performing machine learning on a user input signal input through the sensor to perform user identification and authentication; and identifying a control command corresponding to the user input signal to control the operation of the electric wheelchair, based on the fact that the authentication is successful.

10 Claims, 11 Drawing Sheets

(51) Int. Cl.
| | |
|---|---|
| *A61G 5/04* | (2013.01) |
| *A61G 5/10* | (2006.01) |
| *B60W 60/00* | (2020.01) |
| *G06F 3/0482* | (2013.01) |
| *G06F 3/04847* | (2022.01) |
| *G06V 40/70* | (2022.01) |
| *G10L 17/02* | (2013.01) |
| *G10L 17/04* | (2013.01) |
| *G10L 17/22* | (2013.01) |
| *G06F 3/16* | (2006.01) |

(52) U.S. Cl.
CPC .......... *G06F 3/04847* (2013.01); *G06V 40/70* (2022.01); *G10L 17/02* (2013.01); *G10L 17/04* (2013.01); *G10L 17/22* (2013.01); *A61G 2203/10* (2013.01); *G06F 3/167* (2013.01)

(58) Field of Classification Search
CPC .... G06F 3/0482; G06F 3/04847; G06F 3/167; G06V 40/70; G10L 17/02; G10L 17/04; G10L 17/22
See application file for complete search history.

(56) References Cited

U.S. PATENT DOCUMENTS

| | | | |
|---|---|---|---|
| 2021/0039596 A1* | 2/2021 | Park | B60R 25/23 |
| 2024/0019930 A1* | 1/2024 | Sexton | A61G 5/00 |

FOREIGN PATENT DOCUMENTS

| | | | | |
|---|---|---|---|---|
| KR | 10-1709009 B1 | 2/2017 | | |
| KR | 20180076536 A * | 7/2018 | ............... | A61G 5/04 |
| KR | 10-1964864 B1 | 4/2019 | | |
| KR | 10-2089343 B1 | 3/2020 | | |
| KR | 10-2106572 B1 | 5/2020 | | |
| KR | 10-2132823 B1 | 7/2020 | | |
| WO | WO-2020164003 A1 * | 8/2020 | ............... | A61G 5/06 |

OTHER PUBLICATIONS

Machine Translation of KR-20080114127-A (Year: 2008).*
Machine Translation of KR-20180076536-A (Year: 2018).*
Machine Translation of WO-2020164003-A1 (Year: 2020).*

* cited by examiner

ARTIFICIAL INTELLIGENCE-BASED ELECTRIC WHEELCHAIR CONTROL METHOD AND DEVICE AND SYSTEM THEREFOR

TECHNICAL FIELD

The present invention relates to an electric wheelchair control technology. More specifically, the present invention relates to an artificial intelligence-based electric wheelchair control method capable of adaptively controlling an electric wheelchair according to the impairment or health condition of a user based on artificial intelligence, and a device and system therefor.

BACKGROUND ART

Recently, cars provide safety and convenience to drivers through various advanced driver assistance systems (ADASs) such as lane departure warning (LDW), adaptive cruise control (ACC), forward-collision warning (FCW), blind-spot detection (BSD), etc.

The most important technology in such intelligence system is the technology for recognizing external objects. Such technology includes sensors such as cameras, radars, ultrasonic waves, and LiDARs. These sensors may provide safety and convenience in driving and parking situations through lane detection and vehicle and pedestrian detection in the front and rear and blind spots.

Cameras are devices essentially used in autonomous driving environments of level 2 or above, such as collision prevention, lane keeping, parking assistance, etc., and their use is on the increase as installation of cameras is becoming mandatory in many countries.

In addition, these sensors can effectively avoid accidents even in situations difficult to be detected with environmental sensors such as intersections, in conjunction with vehicle to everything (V2X) communication systems.

In order to overcome the weaknesses of individual sensors, sensor fusion technologies combining sensor information are actively being developed, and technologies for next-generation sensors such as stereo cameras, 3-dimensional image sensors, etc. are also actively being developed.

Recently, sensor technology applied to vehicles is also applied to electric wheelchairs.

The recently launched electric wheelchairs use the technology of detecting a forward obstacle that a user can hardly recognize, for example, speed bumps, steps, puddles, cliff, manholes, etc., with a camera and ultrasonic sensor, etc., and giving a warning alarm to the user or automatically stopping the electric wheelchair.

However, a person with hearing impairment cannot hear a warning alarm, and a person with visual impairment cannot see a warning displayed on a display device.

In addition, a quadriplegic or a patient with amyotrophic lateral sclerosis (ALS), etc., can hardly control a steering mechanism such as a joystick, etc., equipped in the electric wheelchair, normally, thereby disabling from avoiding obstacles.

Particularly, the electric wheelchairs used in medical institutions or nursing homes are shared by many people. Thus, a user may not use the electric wheelchair according to his/her impairment condition and health condition.

Accordingly, there is a demand for an artificial intelligence-based electric wheelchair adaptively operating in consideration of the impairment condition and health condition of a user.

SUMMARY OF INVENTION

Task to be Solved

It is an object of the present invention to provide an artificial intelligence-based electric wheelchair control method, and a device and system therefor.

It is another object of the present invention to provide an artificial intelligence-based electric wheelchair capable of automatically converting an operation mode based on the impairment condition and health condition of a user.

It is yet another object of the present invention to provide an artificial intelligence-based electric wheelchair control method capable of performing customized user authentication by obtaining template data for each authentication means through pre-learning sensing information collected from various authentication sensors, comparing the corresponding template data with characteristic data for each authentication means obtained in real time to determine an authentication weight for each authentication means and setting an optimal authentication level for each user based on the determined authentication weight, and a device and system therefor.

It is yet another object of the present invention to provide an artificial intelligence-based electric wheelchair control method capable of providing user convenience and driving safety by obtaining information on the impairment type and health condition of a user from a server through a user device paired with an electric wheelchair, and adaptively setting an operation control mode of the electric wheelchair based on the obtained user information, and a device and system therefor.

The technical tasks of the present invention are not limited to the technical tasks mentioned above, and other technical tasks not mentioned can be clearly understood by those skilled in the art from the following description.

Means for Solving Task

According to an aspect, an artificial intelligence-based electric wheelchair control method may comprise performing a booting procedure according to power application to pair with a user device; obtaining user information from a server through the paired user device; determining an operation control mode of an electric wheelchair based on the user information: recognizing a predefined start command through a sensor corresponding to the determined operation control mode when an always-on display (AOD) screen is in an inactive status: activating the inactivated screen according to the start command, outputting a user interface screen for controlling the electric wheelchair on a display device and waiting for a user input signal: performing machine learning on a user input signal input through the sensor to perform user identification and authentication; and identifying a control command corresponding to the user input signal to control the operation of the electric wheelchair, based on the fact that the authentication is successful, wherein the user information includes at least one of impairment type information and health condition information.

In an embodiment, the method may further comprise setting an authentication applied user mode, wherein the user authentication includes a user dependent authentication performing authentication for preset specific users and a user independent authentication performing authentication for all users registered in authentication database.

In an embodiment, the operation control mode may include at least one of a manual control mode, a voice recognition control mode, a face recognition control mode, a gesture recognition control mode and an autonomous driving control mode.

In an embodiment, the method may further comprise determining a view type corresponding to a recognized voice command based on the fact that the operation control mode is a voice recognition control mode: determining at least one camera to receive an image corresponding to the determined view type: configuring a view screen based on the image obtained from the determined at least one camera; and displaying the view screen on the screen of the user device or the display device, wherein the view type may comprise at least one of a front view, a left side view, a right side view, a rear view, a left/right side view, a front surround view, a rear surround view and a bird's eye view.

In an embodiment, the method may further comprise detecting a proximate obstacle using at least one of an equipped smart parking assistance system (SPAS) sensor, an ultrasonic sensor and a radar while the electric wheelchair drives, wherein information on the detected proximate obstacle is displayed on one side of the view screen, based on the fact that the proximate obstacle is detected.

In an embodiment, the sensor may include a microphone, a camera and a biometric sensor, wherein the biometric sensor may include at least one of a fingerprint sensor, an iris sensor and a body pressure sensor, wherein a user registration procedure is initiated according to a predetermined user menu selection on the user interface screen, the user registration procedure comprising extracting first characteristic data by recognizing a user's voice through the microphone; extracting second characteristic data by recognizing a user's iris from an image captured by the camera: extracting third characteristic data by recognizing a user's fingerprint through the fingerprint sensor: extracting fourth characteristic data by recognizing a user's face from an image captured by the camera: determining an authentication weight for each characteristic data based on first to fourth templet data pre-learned in correspondence to the first to fourth characteristic data, respectively; and determining an authentication level for the corresponding user based on the authentication weight determined for each of the characteristic data, wherein the extracted characteristic data for each user and information on the determined authentication level may be stored and managed in an internal memory, and the user authentication may be performed according to the authentication level determined for each user.

According to another aspect, an artificial intelligence-based electric wheelchair control system for controlling an electric wheelchair may comprise peripheral boards comprising a display board for displaying a user interface screen on a display device; a sensor board for generating sensing information based on a signal input from a sensor; a communication board allowing the electric wheelchair to communicate with external devices; a drive board for controlling a motor mounted on the electric wheelchair; and a steering board for controlling steering of the electric wheelchair; and an electric wheelchair control device for controlling the overall operation of the electric wheelchair by interworking with the peripheral boards, wherein the electric wheelchair control device performs a booting procedure according to power application to pair with a user device, obtains user information from a server through the paired user device, determines an operation control mode of an electric wheelchair based on the user information, recognizes a predefined start command through the sensor corresponding to the determined operation control mode when an always-on display (AOD) screen is in an inactive status, activates the inactivated screen according to the start command, outputs a user interface screen for controlling the electric wheelchair on the display device and waits for a user input signal, performs machine learning on a user input signal input through the sensor to perform user identification and authentication; and identifies a control command corresponding to the user input signal to control the operation of the electric wheelchair, based on the fact that the authentication is successful, wherein the user information includes at least one of impairment type information and health condition information.

In an embodiment, the electric wheelchair control device may perform the user authentication in a preset authentication applied user mode, wherein the user authentication includes a user dependent authentication performing authentication for preset specific users and a user independent authentication performing authentication for all users registered in authentication database.

In an embodiment, the operation control mode may include at least one of a manual control mode, a voice recognition control mode, a face recognition control mode, a gesture recognition control mode and an autonomous driving control mode.

In an embodiment, the sensor may include a microphone, a camera and a biometric sensor, wherein the biometric sensor may include at least one of a fingerprint sensor, an iris sensor and a body pressure sensor, wherein the electric wheelchair control device may perform a user registration procedure according to a user menu selection on the user interface screen, the user registration procedure comprising extracting first characteristic data by recognizing a user's voice through the microphone; extracting second characteristic data by recognizing a user's iris from an image captured by the camera; extracting third characteristic data by recognizing a user's fingerprint through the fingerprint sensor; extracting fourth characteristic data by recognizing a user's face from an image captured by the camera; determining an authentication weight for each characteristic data based on first to fourth templet data pre-learned in correspondence to the first to fourth characteristic data, respectively; and determining an authentication level for the corresponding user based on the authentication weight determined for each of the characteristic data, wherein the extracted characteristic data for each user and information on the determined authentication level may be stored and managed in an internal memory, and the user authentication may be performed according to the authentication level determined for each user.

The technical tasks of the present invention are not limited to the technical tasks mentioned above, and other technical tasks not mentioned can be clearly understood by those skilled in the art from the following description.

Effect of Invention

The present invention has an advantage of providing an artificial intelligence-based electric wheelchair control method and device and system therefor.

In addition, the present invention has an advantage of providing an artificial intelligence-based electric wheelchair capable of automatically converting an operation control mode of an electric wheelchair based on the impairment condition and health condition of a user.

In addition, the present invention has an advantage of providing an artificial intelligence-based electric wheelchair control method capable of performing customized user authentication by obtaining template data for each authentication means through pre-learning sensing information collected from various authentication sensors, comparing the obtained template data with characteristic data for each authentication means obtained in real time to determine an authentication weight for each authentication means, and setting an optimal authentication level for each user based on the determined authentication weight, and a device and system therefor.

In addition, the present invention has an advantage of providing an artificial intelligence-based electric wheelchair control method capable of providing user convenience and driving safety by obtaining information on the impairment type and health condition of a user from a server through a user device paired with an electric wheelchair in real time, and adaptively setting an operation control mode of the electric wheelchair based on the obtained user information, and a device and system therefor.

In addition, the present invention has an advantage of providing an artificial intelligence-based electric wheelchair, capable of being efficiently shared in health facilities such as medical institutions and nursing homes.

In addition to the above, various effects identified directly or indirectly through the present document may be provided.

BRIEF OF DESCRIPTION OF DRAWINGS

BEST MODE FOR CARRYING OUT THE INVENTION

Figure 1:
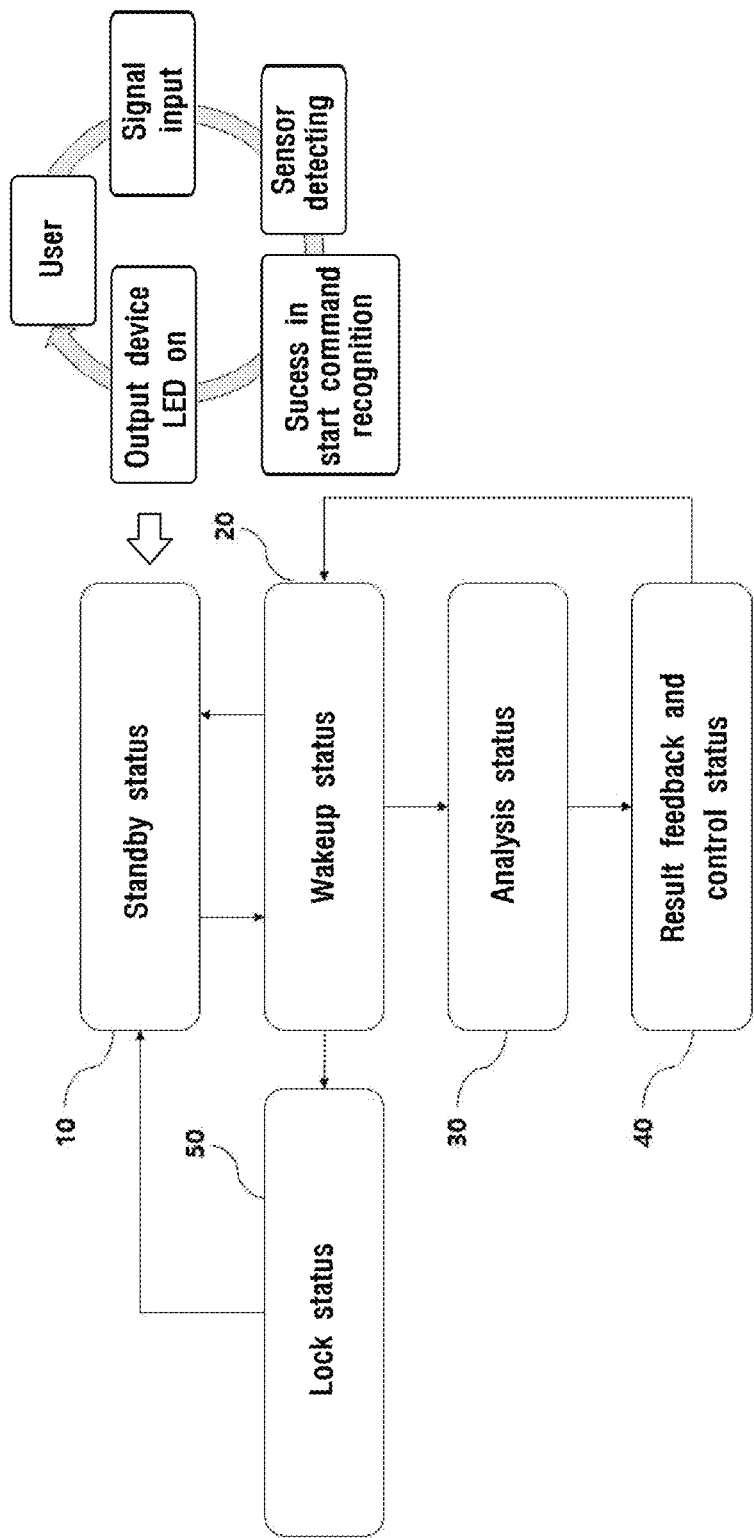
FIG. 1 is a status diagram of an artificial intelligence-based electric wheelchair control device according to an embodiment.

Hereinafter, some embodiments of the present invention will be described in detail through exemplary drawings. In adding reference numerals to the components of each drawing, it should be noted that the same components have the same numerals as much as possible even if they are displayed on different drawings. In addition, in describing an embodiment of the present invention, when it is determined that a detailed description of a related known configuration or function hinders understanding of the embodiment of the present invention, the detailed description thereof will be omitted.

In describing the components of the embodiment of the present invention, terms such as first, second, A, B, (a), and (b) may be used. These terms are only used to distinguish the component from other components, and the nature, sequence, or order of the corresponding component is not limited by the term. In addition, unless defined otherwise, all terms used herein, including technical or scientific terms, have the same meaning as commonly understood by a person of ordinary skill in the art to which the present invention belongs. Terms such as those defined in commonly used dictionaries should be interpreted as having a meaning consistent with the meaning in the context of the related art, and unless explicitly defined in this application, should not be interpreted in an ideal or excessively formal meaning.

FIG. 1 is a status diagram of an artificial intelligence-based electric wheelchair control device according to an embodiment.

Referring to FIG. 1, the electric wheelchair control status may largely include standby status 10, wakeup status 20, analysis status 30, result feedback and control status 40 and lock status 50.

When the initial booting procedure is done, the electric wheelchair control device may transit to standby status 10.

While the initial booting procedure is in progress or when the initial booting procedure is done, the electric wheelchair control device according to an embodiment may automatically pair with a predefined (or proximate) user device, and obtain user information from a server through the paired user device. Here, the user information may include at least one of impairment type information and health condition information. The server according to an embodiment may be a server managed by pre-registered medical institutions and/or nursing homes or a dedicated server separately operated to provide artificial intelligence-based electric wheelchair service.

The electric wheelchair control device may determine an initial operation control mode of the electric wheelchair based on the user information obtained from the server. Here, the initial operation control mode may include a manual control mode, a voice recognition control mode, a face recognition control mode, a gesture recognition control mode, an autonomous driving control mode, etc., but is not limited thereto. For example, when the user can freely move his/her hands, the initial operation control mode may be set as manual control mode. When the user has a hearing impairment, the initial operation control mode may be set as gesture recognition control mode. When the user has a hearing impairment, the initial operation control mode may be set as autonomous driving control mode. When the user is a quadriplegic or a patient with amyotrophic lateral sclerosis (ALS), the initial operation control mode may be set as face recognition control mode or voice recognition control mode.

Standby status 10 may mean a status waiting for a user specific input, i.e., wakeup command, through a sensor corresponding to the initial operation control mode when the electric wheelchair control device is in always-on display (AOD) operation mode while the electric wheelchair is stopped or running. In standby status 10, the display screen, e.g., LED touch screen, of the electric wheelchair control device may be in an inactive status, i.e., in an OFF status.

For example, if the predetermined/pre-registered gesture, e.g., hand gesture, predetermined/pre-registered face movement, and predetermined/pre-registered voice keyword, e.g., wakeup voice command, according to the initially set operation control mode are input by the user, the electric wheelchair control device in standby status 10 may recognize the user input through a sensor, and convert the display screen in an inactive status to in an active status, i.e., ON status, if the recognized input signal matches the predetermined/pre-registered information. When the display screen is activated, the electric wheelchair control device may configure and display the user interface screen.

When the display screen is activated, the electric wheelchair control device may transit from standby status 10 to wakeup status 20, and notify that the electric wheelchair is in a status capable of being controlled by the user according to the operation control mode set through a speaker provided on one side of the electric wheelchair, a paired user device or an equipped display screen.

In wakeup status 20, the electric wheelchair control device may wait for a user input signal through a specific sensor corresponding to the set operation control mode and transit to analysis status 30 if a user input signal is detected.

In analysis status 30, the electric wheelchair control device may identify a user control command by analyzing the user input signal with an artificial intelligence engine mounted thereon. Here, the artificial intelligence engine may include at least one of a voice recognition engine, a face recognition engine, a gesture recognition engine and a touch recognition engine.

If the user input signal is normally analyzed, the electric wheelchair control device may transit to result feedback status 40 and transmit a predetermined control command corresponding to the analysis result to the corresponding system (or device or board). For example, when the user input signal is analyzed as a steering control command, the electric wheelchair control device may transmit the corresponding steering control command to a drive board for controlling a motor. For another example, when the user input signal is analyzed as a camera view screen control command, the electric wheelchair control device may transmit the corresponding camera control command to a camera system to obtain images captured by cameras, and configure the obtained images into a view screen to display the view screen on the corresponding display device, e.g., a screen of a user display screen or a display screen equipped in the electric wheelchair.

In an embodiment, the electric wheelchair may have a plurality of cameras, and the electric wheelchair control device may request the camera system to transmit images captured by the plurality of cameras according to the user input signal. In this case, the electric wheelchair control device may adaptively configure a view screen according to the types of cameras from which the images are received to be output on the corresponding display screen. For example, the cameras may include a front camera, a left/right side view camera and a rear camera.

For example, when the electric wheelchair control device receives images captured by the front camera, the screen of a user device or the equipped display screen may be controlled to display images captured by the front camera.

For another example, when the electric wheelchair control device receives images captured by the left/right side view camera, the view screen may be controlled to configure two areas, first area (left side) and second area (right side), to display the images captured by the left side view camera on the first area and the images captured by the right side view camera on the second area.

For yet another example, when the electric wheelchair control device receives images captured by the left/right side view camera and the front camera, the electric wheelchair control device may configure and output the front surround view screen based on the received images.

For yet another example, when the electric wheelchair control device receives images captured by the left/right side view camera and the rear camera, the electric wheelchair control device may configure and output the rear surround view screen based on the received images.

For yet another example, when the electric wheelchair control device receives images captured by the front camera, the left/right side view camera and the rear camera, the electric wheelchair control device may configure and output the bird's eye view screen based on the received images.

In analysis status 30, when failing to recognize a user input signal, the electric wheelchair control device may transit to result feedback status 40 and output a predetermined notification message notifying the failure of user input signal recognition through a speaker (or user device).

According to the preset security and/or lock mode, the electric wheelchair control device may perform user identification and authentication through machine learning (or deep learning) on the user input signal.

When user identification and authentication are successful, the electric wheelchair control device may control the electric wheelchair according to the user input signal. When user identification or authentication fails, the electric wheelchair control device may output a predetermined warning alarm message notifying that the user identification or authentication has failed, and transit from result feedback status 40 to wakeup status 20.

When user identification and authentication failed a predetermined number of times or more, the electric wheelchair control device may output a predetermined warning alarm message notifying that the user is an unregistered user, and then transit to the lock status 50. For example, in lock status 50, the electric wheelchair control device may provide authentication failure information including the current location information to a server (or predetermined manager terminal) through the user device. Here, the current location of the electric wheelchair may be determined using a GPS receiver equipped in the user device, which is merely an exemplary embodiment, and a GPS receiver may be mounted on one side of the electric wheelchair.

According to the preset security and/or lock mode level, in lock status 50, the electric wheelchair control device may perform at least one biometric recognition among fingerprint recognition, iris recognition, face recognition and weight recognition to perform user identification and authentication. When biometric recognition is successful, the electric wheelchair control device may transit to wakeup status 20 and wait for a user input signal.

In an embodiment, when the result feedback is completed, the electric wheelchair control device may return to wakeup status 20 and wait for a next user command.

The electric wheelchair control device may drive a wakeup timer for a predefined time each time the device enters wakeup status 20. The electric wheelchair control device may wait for a user input signal for controlling the electric wheelchair only when the wakeup timer is running. If the wakeup timer expires, the electric wheelchair control device may transit to standby status 10 and inactivate the display screen.

The electric wheelchair control device according to an embodiment may transit to standby status 10 when user identification and authentication failed a predetermined number of times or more in wakeup status 20 according to the menu setting.

The electric wheelchair control device according to an embodiment may transit to standby status 10 when detecting a quit command pre-registered in at least one status of wakeup status 20, analysis status 30 and result feedback status 40.

Figure 2:
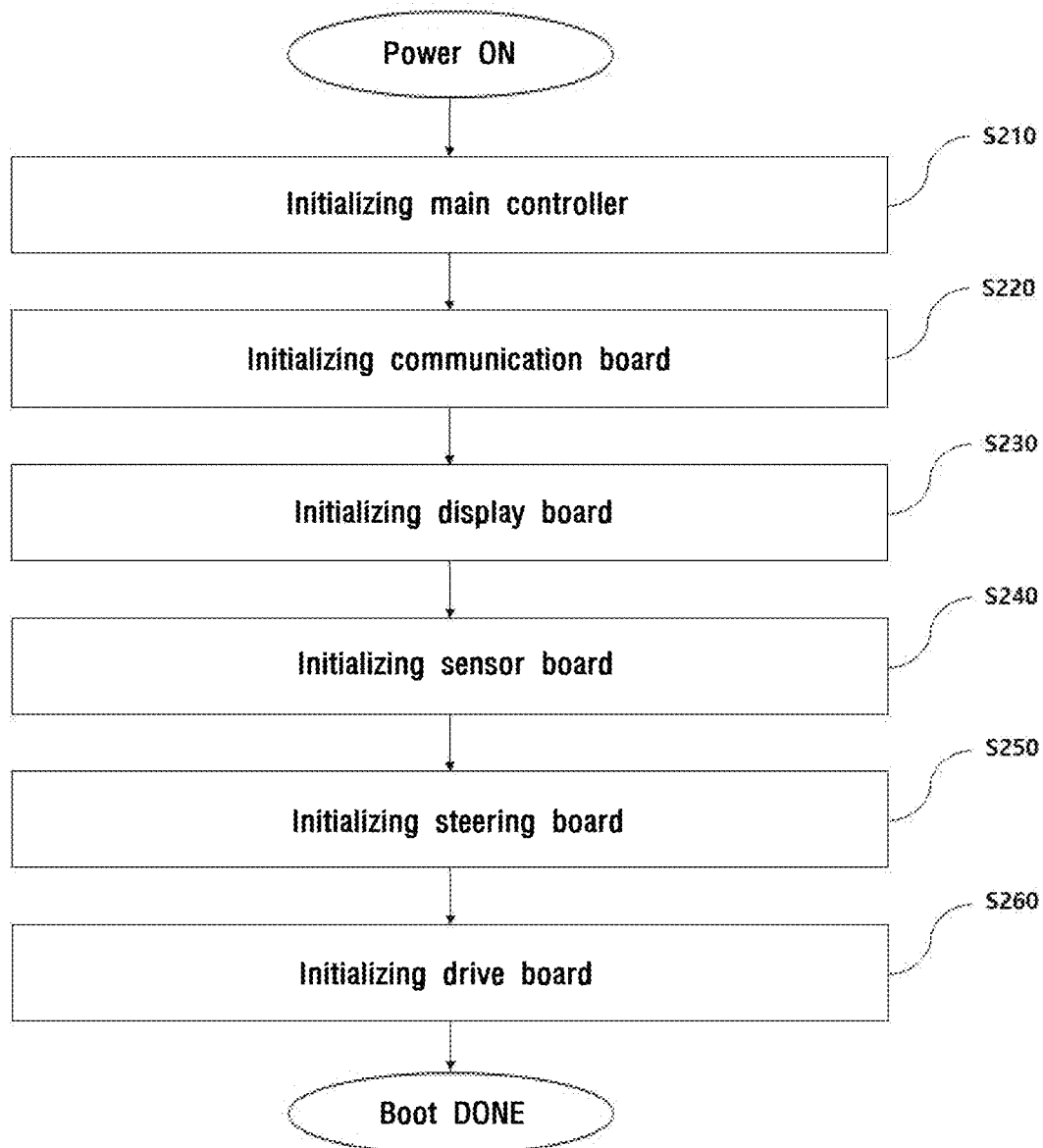
FIG. 2 is a flowchart for illustrating an initial booting procedure of an electric wheelchair control device according to an embodiment.

FIG. 2 is a flowchart for illustrating an initial booting procedure of an electric wheelchair control device according to an embodiment.

When power is applied, the electric wheelchair control device may initialize the main controller, i.e., main processor, through a boot/loader (S210).

The main controller may initialize a communication board for communication with external devices and systems (S220).

For example, when the communication board is initialized, the electric wheelchair control device may search for a user device and pair with the searched user device. The electric wheelchair control device may interwork with external devices, such as an intersection (or a traffic) signal system, a road side unit (RSU), a base station, etc., through the user device. For example, the electric wheelchair control device may obtain the current traffic signal information from the intersection signal system through the user device. For another example, the electric wheelchair control device may interwork with the server through the base station to obtain user information.

The main controller may initialize the display board and activate the AOD operation mode (S230).

The main controller may initialize the sensor board (S240). The main controller may receive, through the sensor board, an image signal captured by a camera(s) mounted on the electric wheelchair and a user voice signal input through a microphone. Also, the main controller may receive, through the sensor board, an iris recognition signal, a fingerprint recognition signal, a gesture recognition signal, a touch recognition signal, an illumination sensing signal, etc. In addition, the sensor board may be connected to an ultrasonic sensor, a radar, a smart parking assistance sensor (SPAS), etc., to receive sensing signals from the corresponding sensors.

The main controller may maintain resolution and sensing accuracy of the cameras and sensors at a predefined level by performing calibration on cameras and various sensors connected to the sensor board.

The main controller may initialize the steering board and the drive board to complete the booting procedure (S250 and S260). The drive board may be configured to control a motor(s) for driving the electric wheelchair.

The main controller according to an embodiment may be automatically connected to the pre-registered user device wirelessly or wiredly upon initialization of the communication board. For example, the electric wheelchair control device and user device may exchange information via close range wireless communication, e.g., Bluetooth communication.

Figure 3:
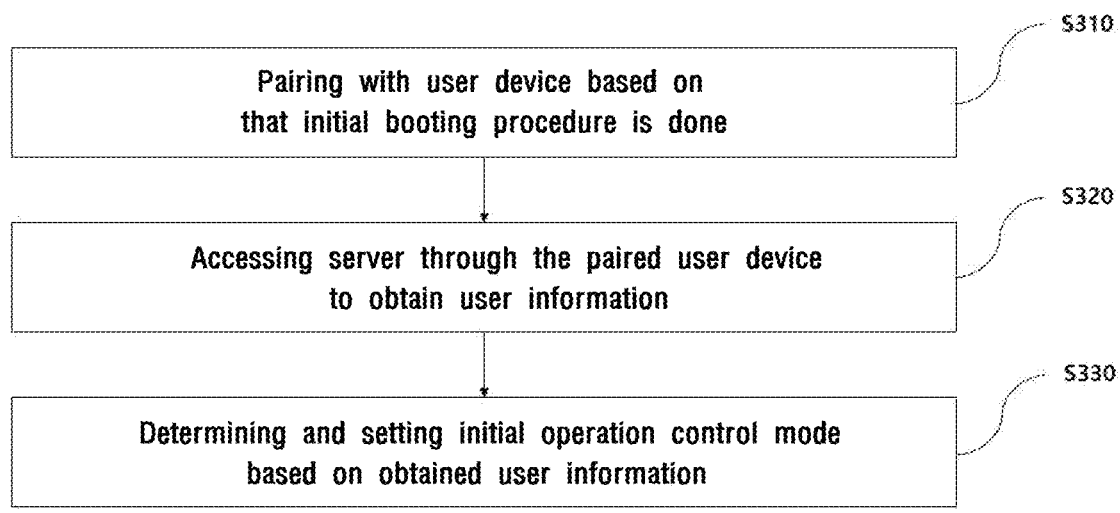
FIG. 3 is a flowchart for illustrating a procedure for setting an initial operation control mode of an electric wheelchair according to an embodiment.

FIG. 3 is a flowchart for illustrating a procedure for setting an initial operation control mode according to an embodiment.

Referring to FIG. 3, when the initial booting procedure is done, the electric wheelchair control device may pair with a user device (S310).

The electric wheelchair control device may access a server through the paired user device to obtain user information (S320).

The electric wheelchair control device may determine and set an initial operation control mode based on the obtained user information (S330).

Through the aforementioned embodiment, the present invention adaptively determines and sets the initial operation control mode according to the impairment type and health condition of the user, and has an advantage of minimizing user inconvenience and controlling the electric wheelchair more safely.

Figure 4:
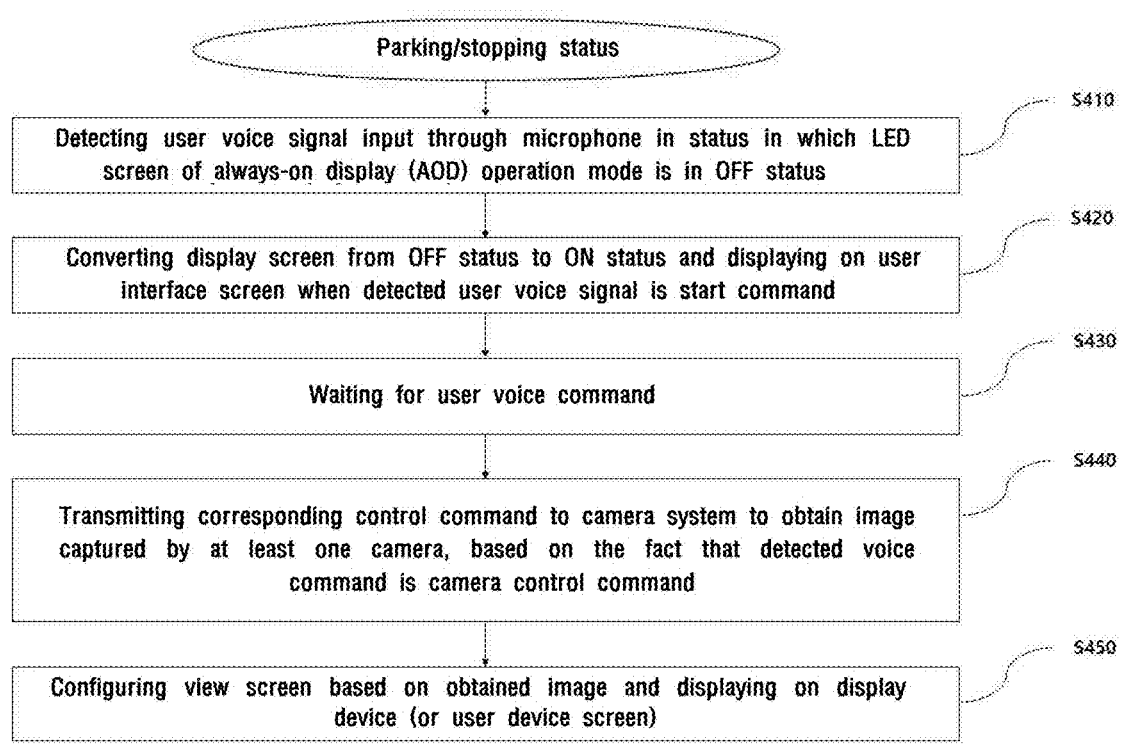
FIG. 4 is a flowchart for illustrating an electric wheelchair control method of an electric wheelchair control device according to an embodiment.

FIG. 4 is a flowchart for illustrating an electric wheelchair control method of an electric wheelchair control device according to an embodiment.

Specifically, FIG. 4 is a diagram for illustrating a method by which the electric wheelchair control device interworks with a camera system to provide a view screen, when the initial operation control mode is set as voice recognition control mode.

Referring to FIG. 4, in a status in which the LED screen of always-on display (AOD) operation mode is inactivated, i.e., the screen is in an OFF status, the electric wheelchair control device may detect a user voice signal input through a microphone (S410).

The electric wheelchair control device may analyze the detected voice signal with a voice recognition engine mounted thereon, and, when the detected voice signal is a predefined start command, convert the display screen from OFF status to ON status to display the user interface screen on a display device (S420).

The electric wheelchair control device may wait for a user voice command (S430).

The electric wheelchair control device may detect a user voice command, and, when the detected voice command is a camera control command, transmit the corresponding control command to the camera system to obtain images captured by at least one camera (S440).

Here, the camera control command may include a front view display command, a left side view display command, a right side view display command, a rear view display command, a left/right side view display command, a front surround view display command, a rear surround view display command, a bird's eye view display command, etc., but is not limited thereto.

The electric wheelchair control device may configure a view screen based on the obtained image(s) to display the screen on a display device (or user device) (S450).

Figure 5:
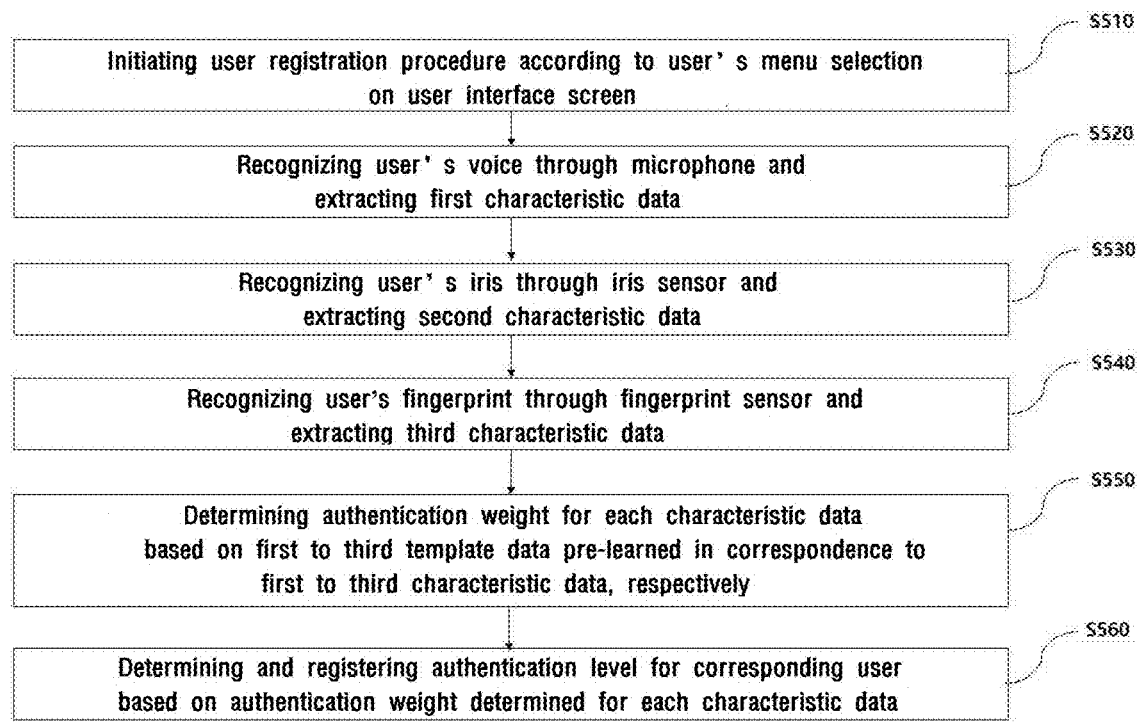
FIG. 5 is a flowchart for illustrating a user registration procedure of an electric wheelchair control device according to an embodiment.

FIG. 5 is a flowchart for illustrating a user registration procedure of an electric wheelchair control device according to an embodiment.

Referring to FIG. 5, the electric wheelchair control device may initiate a user registration procedure according to the user menu selection on a user interface screen (S510).

The electric wheelchair control device may extract first characteristic data by recognizing user's voice through a microphone (S520).

The electric wheelchair control device may extract second characteristic data by recognizing user's iris through an iris sensor (S530).

The electric wheelchair control device may extract third characteristic data by recognizing user's fingerprint through a fingerprint sensor (S540).

The electric wheelchair control device may determine an authentication weight for each characteristic data based on first to third template data pre-learned in correspondence to the first to third characteristic data, respectively (S550).

An authentication level for the corresponding user may be determined and registered based on the authentication weight determined for each characteristic data (S560). Here, the extracted characteristic data for each user and information on the determined authentication level may be stored and managed in user database.

For example, some people may have stronger voice characteristics than other people. This may mean that user identification and authentication are easier through voice. Also, some people may have weak voice characteristics, but strong iris characteristics. In this case, user identification and authentication accuracy may be improved by setting a higher authentication weight for the iris than for the voice. As described above, by adaptively determining the authentication weight based on the characteristics of authentication data for each user and determining the optimal authentication level accordingly, the present invention is not only capable of improving the reliability of user identification and authentication, but also capable of minimizing user inconvenience by minimizing unnecessary user authentication.

In the embodiment of FIG. 5, voice recognition, iris recognition, fingerprint recognition, etc. have been described as user authentication means, but this is only an embodiment, and other biometric means such as face recognition and weight recognition may be additionally applied.

Figure 6:
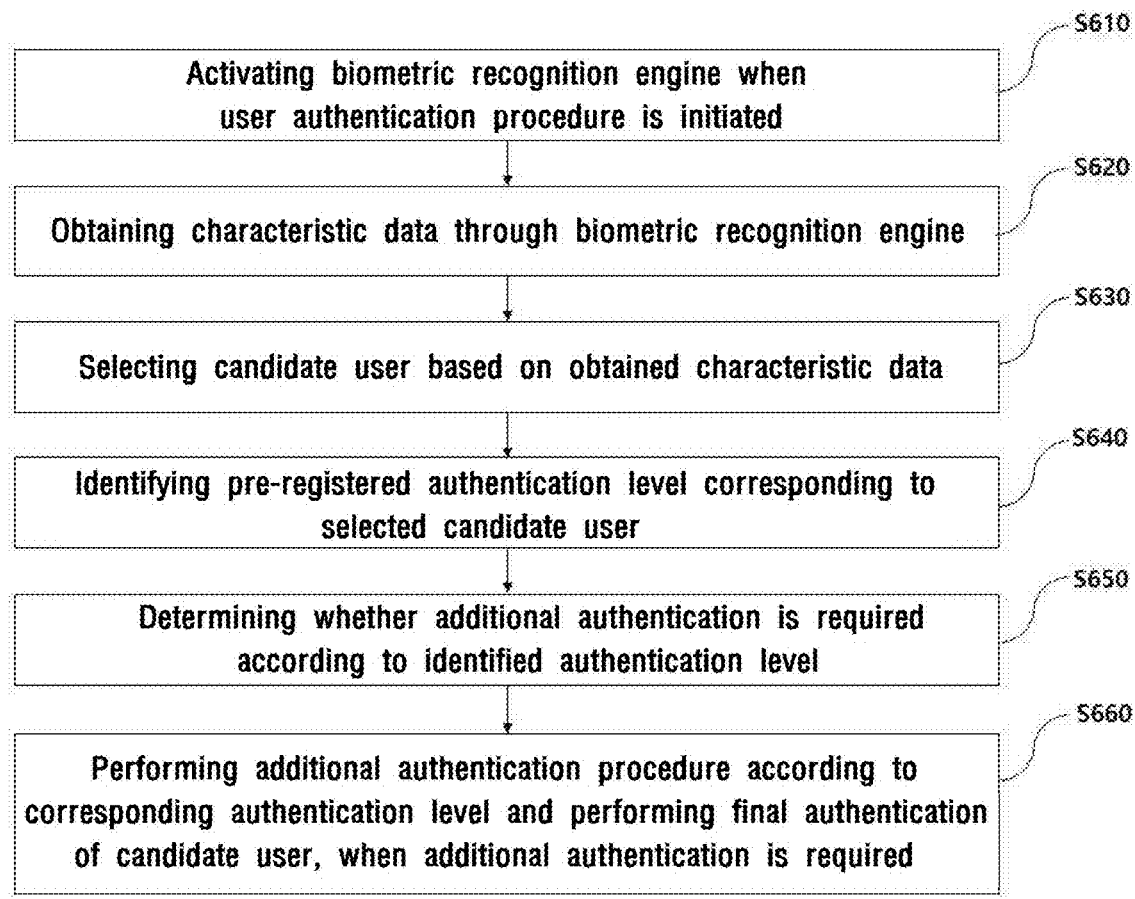
FIG. 6 is a flowchart for illustrating a user authentication procedure of an electric wheelchair control device according to an embodiment.

FIG. 6 is a flowchart for illustrating a user authentication procedure of an electric wheelchair control device according to an embodiment.

Referring to FIG. 6, the electric wheelchair control device may activate a biometric recognition engine when the user authentication procedure is initiated (S610).

Here, the biometric recognition engine may include at least one of a voice recognition engine, an iris recognition engine, a fingerprint recognition engine, a face recognition engine and a gesture recognition engine.

The electric wheelchair control device may obtain at least one characteristic data through the at least one biometric recognition engine (S620).

The electric wheelchair control device may select a candidate user from the user database based on the obtained characteristic data (S630). Here, a plurality of candidate users may be provided according to the characteristic data.

The electric wheelchair control device may identify a pre-registered authentication level corresponding to the selected candidate user (S640).

The electric wheelchair control device may determine whether additional authentication is required according to the identified authentication level (S650).

When additional authentication is required, the electric wheelchair control device may perform an additional authentication procedure according to the corresponding authentication level and perform final authentication of the candidate user(s) (S660).

In step 650, when it is determined that additional authentication is not required, the electric wheelchair control device may determine the selected candidate user as the finally authenticated user.

As described above, the present invention has an advantage of identifying and authenticating a user more effectively by adaptively determining a biometric means for user authentication according to a pre-registered authentication level.

In addition, the present invention has an advantage of minimizing user inconvenience by performing a minimal authentication procedure according to a predetermined authentication level for each user.

Figure 7:
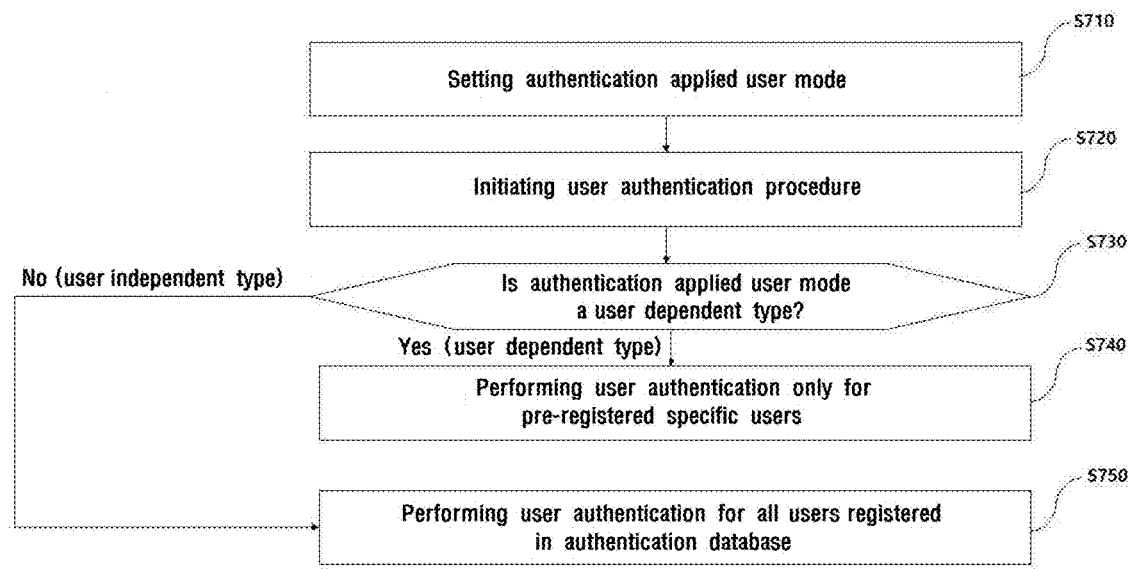
FIG. 7 is a flowchart for illustrating a user authentication procedure according to an authentication applied user mode according to an embodiment.

FIG. 7 is a flowchart for illustrating a user authentication procedure according to an authentication applied user mode according to an embodiment.

Referring to FIG. 7, the electric wheelchair control device may receive an authentication applied user mode through a predetermined user menu selection (S710).

Here, the authentication applied user mode may be divided into a user dependent mode and a user independent mode.

The user dependent mode is a mode in which the user authentication procedure is performed for users pre-registered (pre-selected) by the user.

The user independent mode is a mode in which the user authentication procedure is performed for all users registered in the authentication database.

In the case of user dependent mode, since the user authentication procedure is performed only for specific users, user authentication may be performed faster. However, authentication may fail for users who are not registered (or selected) as user dependent mode.

On the other hand, since user independent mode performs user authentication for all users registered in the authentication database, the probability of authentication failure is very low. However, the time required for user authentication increases compared to user dependent mode.

When a user input signal is detected, the electric wheelchair control device may initiate a user authentication procedure (S720).

When the user authentication procedure is initiated, the electric wheelchair control device may determine whether the currently set authentication applied user mode is a user dependent mode or a user independent mode (S730).

As a result of the determination, in the case of user dependent mode, the electric wheelchair control device may perform user authentication only for specific users pre-registered (or pre-selected) (S740).

As a result of the determination in step S730, in the case of user independent mode, the electric wheelchair control device may perform user authentication for all users registered in the authentication database (S750).

Figure 8:
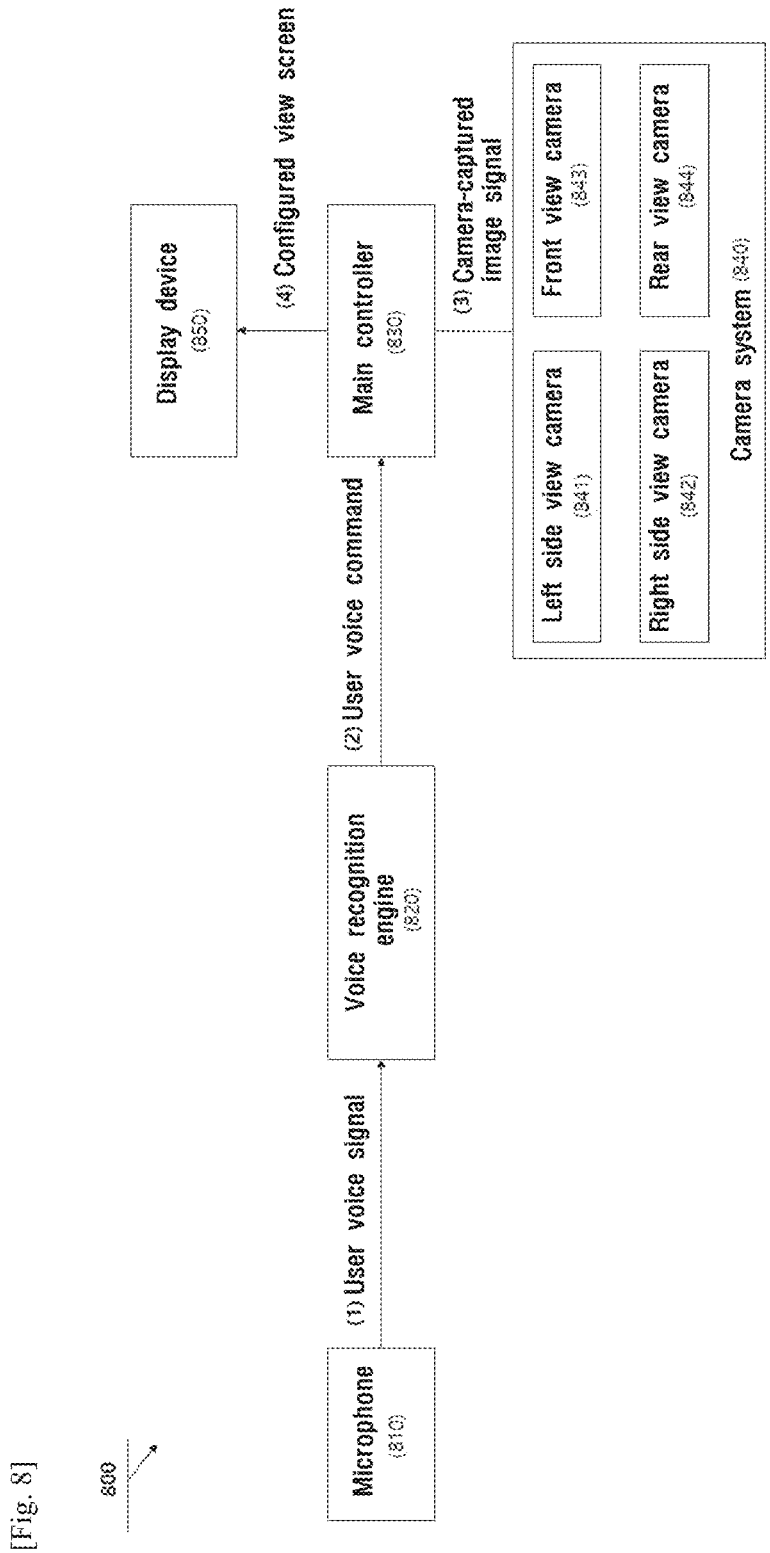
FIG. 8 is a diagram for illustrating the specific operation of an electric wheelchair which provides a voice recognition artificial intelligence-based camera view screen according to an embodiment.

FIG. 8 is a diagram for illustrating the specific operation of an electric wheelchair which provides a voice recognition artificial intelligence-based camera view screen according to an embodiment.

Referring to FIG. 8, an electric wheelchair 800 may comprise a microphone 810, a voice recognition engine 820, a main controller 830, a camera system 840, and a display device 850.

The camera system 840 according to an embodiment may comprise a left side view camera 841, a right side view camera 842, a front view camera 843 and a rear view camera 844, but this is merely an embodiment, and the camera system 840 may comprise more or fewer cameras.

In another embodiment, the camera system 840 may comprise a surround view monitor (SVM) camera. The SVM camera may be installed in the front/rear/left/right side of the vehicle to provide a wide view (front camera view) as well as a front top view (or front surround view) (front/left/right camera composite view), left side view (left camera view), right side view (right camera view), rear view (rear camera view), rear top view (or rear surround view) (rear/left/right camera composite view), etc.

As yet another embodiment, the camera system 840 may comprise a smart parking assistance system (SPAS) sensor. In this case, the main controller 830 may detect a proximate obstacle based on sensing information received from the SPAS sensor. When detecting a proximate obstacle, the main controller 830 may display proximate obstacle detection information through the display device 850. For example, the main controller 830 may identify the location of the detected obstacle based on sensing information received from the SPAS sensor. The main controller 830 may match the identified obstacle to the camera view screen corresponding to the identified obstacle location. For example, when an obstacle is detected on the left side of the vehicle, the main controller 830 may configure a view screen including the obstacle detection result in an image captured by the left side camera and display the view screen on the display device 850. Through this, the user may intuitively check where the proximate obstacle is located.

Hereinafter, a procedure of a voice recognition AI-based electric wheelchair 800 configuring the view screen will be described in detail.

A user voice signal input through the microphone 810 may be input in a voice recognition engine.

After removing noise from the received voice signal, the voice recognition engine 820 may process the voice signal in natural language, and extract a keyword, i.e., a user voice command.

The main controller 830 may identify a view type based on the user voice command extracted by the voice recognition engine 820, and request the camera system 840 to transmit an image corresponding to the identified view type. The camera system 840 may transmit at least one camera image corresponding to the identified view type to the main controller 830.

Figure 9:
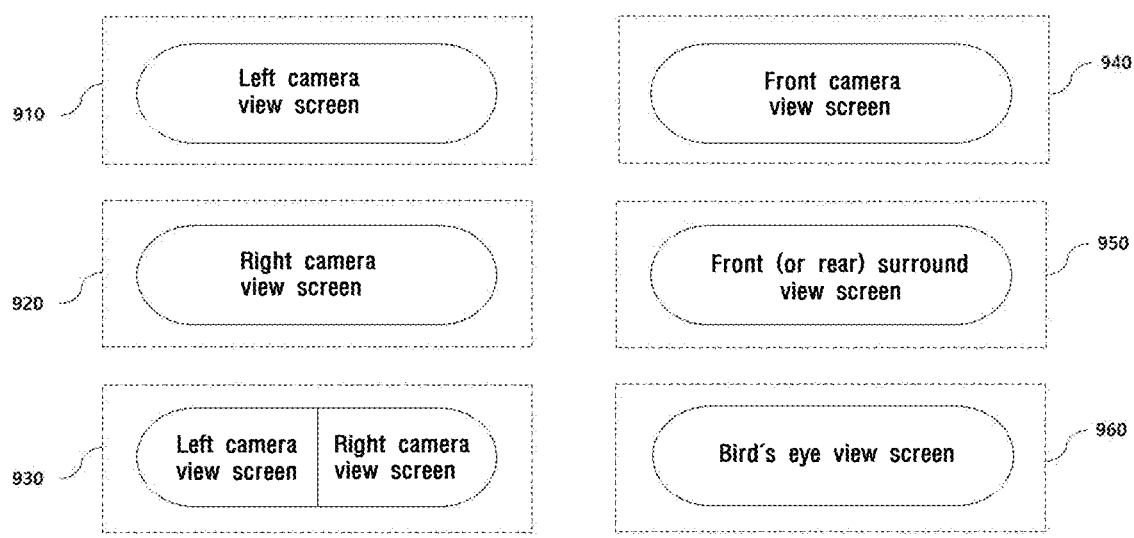
FIG. 9 is an example of a view screen provided by an electric wheelchair control device according to an embodiment.

The main controller 830 may configure a view screen to be displayed on the display device 850 based on the images received from the camera system 840 and display the configured view screen on the display device 850. As illustrated in FIG. 9, the view screen that may be configured by the main controller 830 may be configured in various ways according to the user voice command.

FIG. 9 is an example of a view screen provided by an electric wheelchair control device according to an embodiment.

Referring to FIG. 9, the view screen that may be displayed on the display device 850 may include a left camera view screen 910, a right camera view screen 920, a left and right camera view screen 930, a front camera view screen 940, a front (or rear) surround view screen 950 and a bird's eye view screen 960.

The electric wheelchair 800 may adaptively configure a view screen according to a user voice command and display the view screen on the display device 850.

When the electric wheelchair 800 according to an embodiment interworks with the SPAS sensor and detects a proximate obstacle, it may configure a view screen to further display obstacle detection information on one side of the corresponding view screen. Here, the obstacle detection information may include obstacle location information and obstacle type information, but is not limited thereto.

Figure 10:
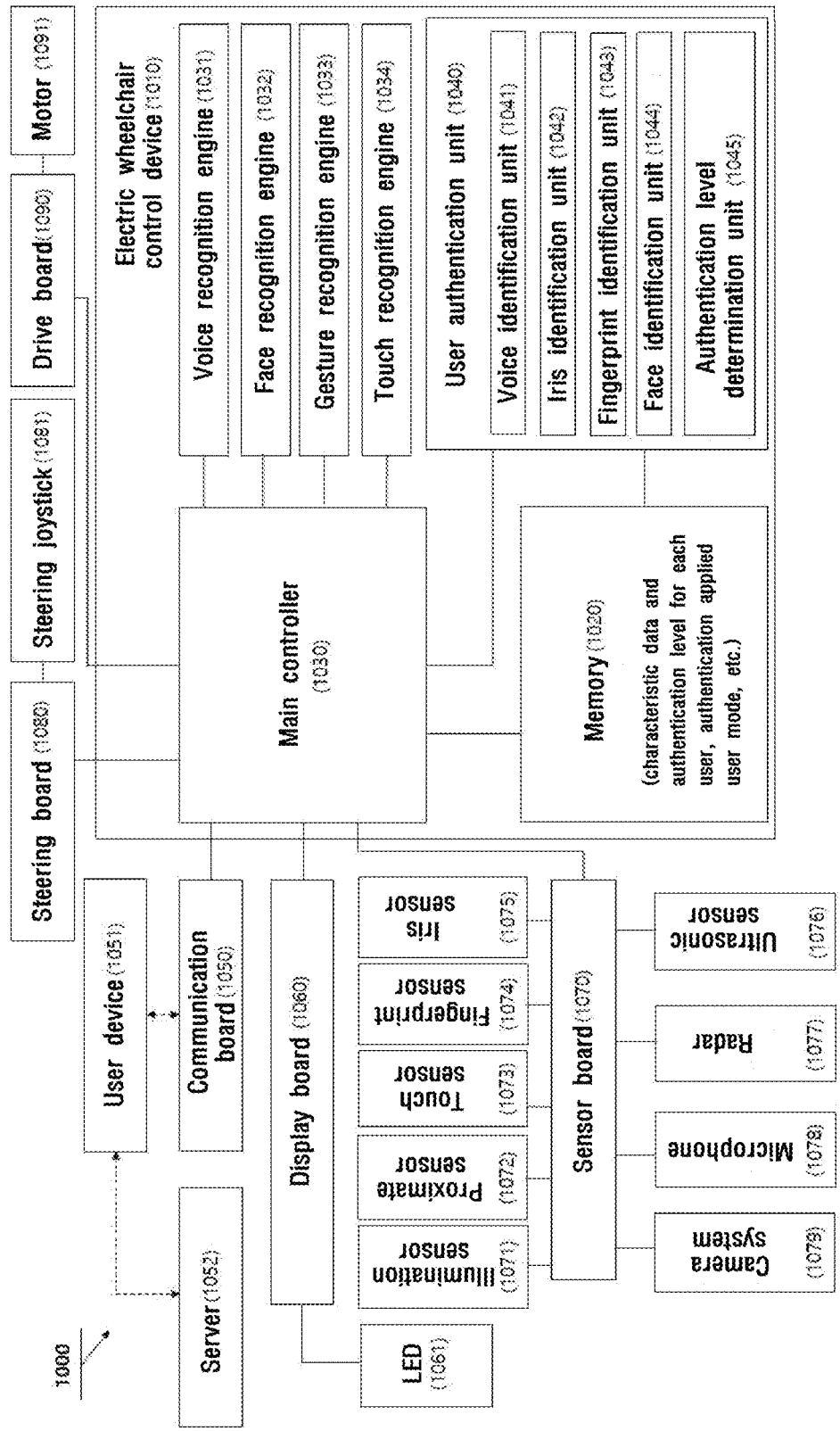
FIG. 10 is a block diagram for illustrating the structure of an electric wheelchair system according to an embodiment of the present invention.

FIG. 10 is a block diagram for illustrating the structure of an electric wheelchair system according to an embodiment of the present invention.

As illustrated in FIG. 10, the electric wheelchair system 1000 may comprise an electric wheelchair control device 1010, peripheral control boards connected to the electric wheelchair control device 1010, a user device 1051 and a server 1052.

The peripheral control boards may include a communication board 1050, a display board 1060, a sensor board 1070, a steering board 1080 and a drive board 1090.

The communication board 1050 has an antenna and a transceiver for communication with external devices to establish a communication channel with the user device 1051 and exchange information via the established communication channel. For example, the communication board 1050 may provide at least one communication function of Blue tooth communication, 4G long term evolution (LTE) communication, 5G new radio (NR) communication and Wi-Fi communication.

Further, the communication board 1050 may be connected to the user device 1051 to transmit a view screen configured by the electric wheelchair control device 1010 to the user device 1051. The user device 1051 may display the received view screen on one side of the screen.

The display board 1060 may be connected to an LED 1061 having a touch sensor, and display the user interface screen and various status information of the electric wheelchair 1000 on the LED 1061 according to a control signal of the electric wheelchair control device 1010. The display board 1060 may control the LED 1061 in AOD operation mode.

The sensor board 1070 may be connected to at least one of an illumination sensor 1071, a proximate sensor 1072, a touch sensor 1072, a fingerprint sensor 1074, an iris sensor 1075, an ultrasonic sensor 1076, a radar 1077, a microphone 1078 and a camera system 1079, and provide the sensing information obtained from the corresponding sensor to the electric wheelchair control device 1010. The electric wheelchair control device 1010 may perform the operation of illumination recognition, gesture recognition, touch recognition, user authentication, user voice recognition, etc., based on the sensing information or voice signal received from the at least one of the illumination sensor 1071, the proximate sensor 1072, the touch sensor 1073, the fingerprint sensor 1074, the iris sensor 1075, and the microphone 1078.

Further, the sensor board 1070 may be connected to the camera system 1079 to receive image signals captured by at least one camera and provide the received image signals to the electric wheelchair control device 1010. The electric wheelchair control device 1010 may configure a view screen based on the image signals received from the sensor board 1070 and transmit the configured view screen to the display board 1060 and/or communication board 1050.

In addition, the sensor board 1070 may be connected to an SPAS sensor (not shown). The sensor board 1070 may provide the sensing information received from the SPAS sensor to the electric wheelchair control device 1010. For example, the electric wheelchair control device 1010 may detect a proximate obstacle based on the sensing information received from the SPAS sensor.

The sensor board 1070 may perform a calibration operation for the sensors connected upon initialization and the camera system 1079.

The illumination sensor 1071 may measure illuminance around the electric wheelchair control device 1010 and/or LED 1061. The electric wheelchair control device 1010 may dynamically adjust brightness of the screen of the LED 1061 using the illumination sensing information received from the sensor board 1070.

The steering board 1080 may be connected to a steering joystick 1081 to detect a user steering command and control a steering control device (not shown) in the electric wheelchair 1000 according to the detected steering command.

The drive board 1090 may be connected to a motor 1091 to control the driving speed of the motor 1091.

The electric wheelchair control device 1010 may comprise a main controller 1030, a memory 1020, various recognition engines and a user authentication unit 1040.

Here, the recognition engine may comprise at least one of a voice recognition engine 1031 for processing a user voice signal in natural language and recognizing a user control command, a face recognition engine 1032 for recognizing a user face motion from images captured by cameras and recognizing a user control command, a gesture recognition engine 1033 for recognizing and identifying a user gesture and recognizing a user control command corresponding to the identified gesture, and a touch recognition engine 1034 for identifying a user touch motion on the touch screen and recognizing a user control command corresponding to the identified touch motion.

The user authentication unit 1040 may comprise at least one of a voice identification unit 1041, an iris identification unit 1042, a fingerprint identification unit 1043, a face identification unit 1044 and an authentication level determination unit 1045.

The voice identification unit 1041 may extract user voice characteristic from a user input voice signal, compare the extracted user voice characteristic with voice characteristic data pre-registered in the memory 1020, and perform user identification and authentication.

The voice identification unit 1041 may extract characteristic data of the corresponding user's voice based on the user input voice signal, compare the extracted voice characteristic data with pre-learned voice template data, and determine an authentication weight for the corresponding voice characteristic data.

The voice identification unit 1041 may improve voice recognition sensitivity by removing the noise included in the voice signal.

The iris identification unit 1042 may extract user iris characteristic from an iris image received from the iris sensor 1075, compare the extracted user iris characteristic with iris characteristic data pre-registered in the memory 1020, and perform user identification and authentication.

The iris identification unit 1042 may extract characteristic data on the corresponding user's iris based on the iris sensing information, compare the extracted iris characteristic data with pre-learned iris template data, and determine an authentication weight for the corresponding iris characteristic data.

The fingerprint identification unit 1043 may extract user fingerprint characteristic from a fingerprint image received from the fingerprint sensor 1074, compare the extracted user fingerprint characteristic with fingerprint characteristic data pre-registered in the memory 1020, and perform user identification and authentication.

The fingerprint identification unit 1043 may extract characteristic data of the corresponding user fingerprint based on the fingerprint sensing information, compare the extracted fingerprint characteristic data with pre-learned fingerprint template data, and determine an authentication weight for the corresponding fingerprint characteristic data.

The face identification unit 1044 may extract user face characteristic from a user face image captured by cameras, compare the extracted user face characteristic with face characteristic data pre-registered in the memory 1020, and perform user identification and authentication.

The face identification unit 1044 may extract characteristic data on the corresponding user face based on the face sensing information, compare the extracted face characteristic data with pre-learned face template data, and determine an authentication weight for the corresponding face characteristic data.

The authentication level determination unit 1045 may dynamically determine an authentication level for the corresponding user based on the authentication weights determined by the foregoing identification unit(s).

The authentication level determination unit 1045 may align the characteristic data in ascending order of authentication weight, and add up the authentication weight until the cumulative sum of the authentication weight of the aligned characteristic data reaches a predetermined threshold value.

When the cumulative sum of the authentication weight is greater than or equal to a threshold value, the authentication level determination unit 1045 may determine the authentication level based on the type and number of summed characteristic data.

For example, when a threshold value is reached only with the authentication weight corresponding to the voice characteristic data, the authentication level may be determined as a first level. When the cumulative sum of the authentication weight corresponding to the voice characteristic data and the authentication weight corresponding to the iris characteristic data is greater than or equal to a threshold value, the authentication level may be determined as a second level. When the cumulative sum of the authentication weight corresponding to the voice characteristic data, the authentication weight corresponding to the iris characteristic data, and the authentication weight corresponding to the fingerprint characteristic data is greater than or equal to a threshold value, the authentication level may be determined as a third level. When the cumulative sum of the authentication weight corresponding to the voice characteristic data, the authentication weight corresponding to the iris characteristic data, the authentication weight corresponding to the fingerprint characteristic data and the authentication weight corresponding to the face characteristic data is greater than or equal to a threshold value, the authentication level may be determined as a fourth level.

The memory 1020 may store various firmware and software required for the operation of the electric wheelchair control device 1010. Further, the memory 1020 may store database of pre-registered characteristic data for each user for user identification and authentication. The memory 1020 may store information on various parameters including an authentication applied user mode. The memory 1020 may store and manage characteristic data and authentication levels for each user. In addition, the memory 1020 may store template data pre-learned for each authentication type.

The main controller 1030 may recognize at least one of a gesture, a voice command, a face motion and a touch operation of the user and activate the screen of the LED 1061 in an AOD operation mode, according to the set operation control mode.

Further, when the LED 1061 in AOD operation mode is activated, the main controller 1030 may configure a user interface screen for controlling the electric wheelchair 1000 and transmit the configured user interface screen to the display board 1060 to display the screen on the LED 1061.

In addition, pre-learned template data for each authentication type may be maintained in the memory 1020.

The electric wheelchair 1000 is not explicitly illustrated in FIG. 10, and may further comprise a charging battery, a wheelchair frame and footplate, wheels, a speaker, a lamp, a buffer, etc.

The sensor board 1070 according to an embodiment may interwork with a body pressure sensor (not shown) for measuring the body pressure distribution of a passenger on the seat.

The main controller 1030 may control air supply to a seat bolster (not shown) on one side of the seat based on the body pressure sensing information.

Figure 11:
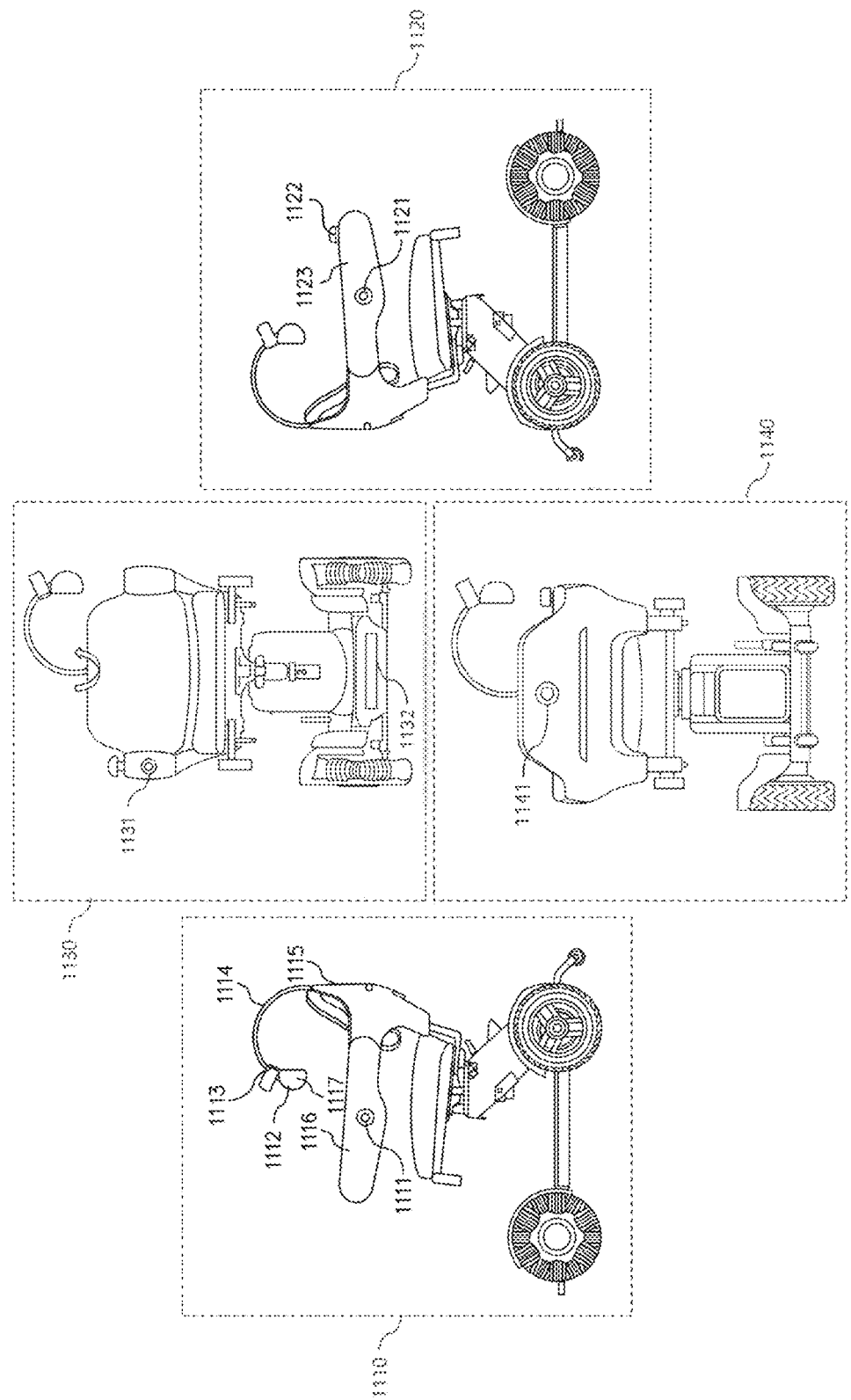
FIG. 11 shows an example of an electric wheelchair according to an embodiment.

FIG. 11 shows an example of an electric wheelchair according to an embodiment.

In FIG. 11, reference numeral 1110 is a left side view of the electric wheelchair; reference numeral 1120 is a right side view of the electric wheelchair: reference numeral 1130 is a front view of the electric wheelchair; and reference numeral 1140 is a rear view of the electric wheelchair.

Referring to reference numeral 1110, a left side camera 1111 for capturing images on the left side of the electric wheelchair may be mounted on one side of the exterior of a left armrest 1116. Further, an end of a support 1114 may be connected to one side of a backrest 1115, and a face camera 1113 for face recognition, a touch display 1112 and a microphone 1117 for voice recognition may be mounted on another end of the support 1114. In an embodiment, the support 1114 may be rotatable to the left and right.

Referring to reference numeral 1120, a right side camera 1121 for capturing images on the right side of the electric wheelchair and a steering lever 1122 may be mounted on one side of the exterior of a right armrest 1123.

Referring to reference numeral 1130, a front camera 1131 for capturing images on the right side of the electric wheelchair may be mounted on one side of the front of right armrest 1123, and an ultrasonic sensor 1132 and/or radar (not shown) for sensing a proximate obstacle may be provided on one side of the lower end of the front of the electric wheelchair.

The electric wheelchair control device 1010 and various boards may be mounted on one side of the electric wheelchair body.

Steps of a method or algorithm described in relation to the embodiments disclosed in the present specification may be directly implemented as hardware executed by a processor, a software module, or a combination of the two. A software module may reside in a storage medium (i.e., memory and/or storage) such as a RAM memory, a flash memory, a ROM memory, an EPROM memory, an EEPROM memory, a register, a hard disk, a removable disk, and a CD-ROM.

An exemplary storage medium is coupled to the processor, and the processor may read information from the storage medium and write information thereon. Alternatively, the storage medium may be integral with the processor. The processor and storage medium may reside in an application specific integrated circuit (ASIC). An ASIC may reside in a user terminal. Alternatively, the processor and storage medium may reside as separate components in a user terminal.

The above description is only an illustrative example of the technical idea of the present invention, and various modifications and variations can be made by those skilled in the art without departing from the essential characteristics of the present invention.

Therefore, the embodiments disclosed in the present invention are not intended to limit the technical idea of the present invention, but to explain, and the scope of the technical idea of the present invention is not limited by these embodiments. The protection scope of the present invention should be construed according to the claims below, and all technical ideas within the equivalent range should be construed as being included in the scope of the present invention.

What is claimed is:

1. A method of controlling an artificial intelligence-based electric wheelchair, the electric wheelchair comprising a wheelchair frame, a plurality of wheels mounted on the frame, a footplate, a display device, a steering joystick, a speaker, a lamp, a buffer, and a control system including a communication board, a sensor board, a display board, a steering board, a drive board, and an electric wheelchair control device operatively connected to the boards, the method comprising:

performing a booting procedure upon application of power to pair the electric wheelchair with a user device;

obtaining user information from a server through the paired user device;

determining an operation control mode of the electric wheelchair based on the obtained user information;

recognizing a predefined start command from a user via a corresponding sensor associated with the determined operation control mode when an always-on display (AOD) screen of the display device is in an inactive state;

activating the display device from the inactive state to an active state in response to the start command and outputting a user interface screen for controlling the electric wheelchair on the display device, and then waiting for a user input signal;

performing a machine learning-based analysis on the user input signal received through the sensor to identify the user and perform user authentication; and when the user authentication is successful, identifying a control command corresponding to the user input signal and controlling movement of the electric wheelchair by executing the control command using at least one of the drive board and the steering board, wherein the user information includes at least one of impairment type information and health condition information.

2. The method of claim 1, further comprising setting an authentication-applied user mode for the user authentication, wherein the user authentication includes a user-dependent authentication performed for preset specific users and a user-independent authentication performed for all users registered in an authentication database.

3. The method of claim 1, wherein the operation control mode includes at least one of a manual control mode, a voice recognition control mode, a face recognition control mode, a gesture recognition control mode, and an autonomous driving control mode.

4. The method of claim 3, wherein the operation control mode is the voice recognition control mode further comprising:

determining a view type corresponding to a recognized voice command;

determining at least one camera to capture an image corresponding to the determined view type;

configuring a view screen based on an image obtained from the determined at least one camera; and displaying the view screen on a screen of the user device or the display device, wherein the view type comprises at least one of a front view, a left side view, a right side view, a rear view, a left/right side view, a front surround view, a rear surround view, and a bird's eye view.

5. The method of claim 4, further comprising detecting a proximate obstacle using at least one of a smart parking assistance system (SPAS) sensor, an ultrasonic sensor, and a radar while the electric wheelchair is being driven, wherein, in response to detecting the proximate obstacle, information regarding the detected proximate obstacle is displayed on one side of the view screen detected.

6. The method of claim 1, wherein the sensor includes a microphone, a camera, and a biometric sensor, the biometric sensor including at least one of a fingerprint sensor, an iris sensor, and a body pressure sensor, and wherein a user registration procedure is initiated in response to a predetermined user menu selection on the user interface screen, the user registration procedure comprising:
- extracting first characteristic data by recognizing the user's voice through the microphone;
- extracting second characteristic data by recognizing the user's iris from an image captured by the camera;
- extracting third characteristic data by recognizing the user's fingerprint through the fingerprint sensor;
- extracting fourth characteristic data by recognizing the user's face from an image captured by the camera;
- determining an authentication weight for each of the first to fourth characteristic data based on first to fourth templet data pre-learned corresponding to each of the first to fourth characteristic data, respectively; and
- determining an authentication level for the user based on the authentication weight determined for each of the first to fourth characteristic data, wherein the extracted first to fourth characteristic data and information on the determined authentication level are stored and managed in an internal memory, and the user authentication is performed according to the determined authentication level.

7. An artificial intelligence-based electric wheelchair, comprising:
- a wheelchair frame;
- a plurality of wheels attached to the frame;
- a footplate attached to the frame;
- a display device;
- a steering joystick;
- a speaker;
- a lamp;
- a buffer;
- a communication board configured to enable the electric wheelchair to communicate with external devices;
- a display board;
- a sensor board configured to generate sensing information from signals provided by sensors of the electric wheelchair;
- a steering board configured to detect input from the steering joystick and to control steering of the electric wheelchair;
- a drive board configured to control a motor that drives one or more of the wheels; and
- an electric wheelchair control device operatively connected to the communication board, the display board, the sensor board, the steering board, and the drive board, and configured to control overall operation of the electric wheelchair, wherein the electric wheelchair control device is configured to:
- perform a booting procedure when power is applied to the electric wheelchair to pair the electric wheelchair with a user device;
- obtain user information from a server via the paired user device;
- determine an operation control mode of the electric wheelchair based on the obtained user information;
- recognize a predefined start command from a user via a corresponding sensor associated with the determined operation control mode while an always-on display (AOD) screen of the display device is in an inactive state;
- activate the display device from the inactive state to an active state in response to the start command and output a user interface screen on the display device for controlling the electric wheelchair, and then await a user input signal;
- perform a machine learning-based analysis on the user input signal received via the sensor to identify the user and perform user authentication; and
- when the user authentication is successful, identify a control command corresponding to the user input signal and execute the control command by controlling at least one of the drive board and the steering board to control movement of the electric wheelchair, wherein the user information includes at least one of impairment type information and health condition information.

8. The artificial intelligence-based electric wheelchair of claim 7, wherein the electric wheelchair control device is configured to perform the user authentication in a preset authentication applied user mode, wherein the user authentication includes a user dependent authentication performed for preset specific users and a user independent authentication performed for all users registered in an authentication database.

9. The artificial intelligence-based electric wheelchair of claim 7, wherein the operation control mode includes at least one of a manual control mode, a voice recognition control mode, a face recognition control mode, a gesture recognition control mode, and an autonomous driving control mode.

10. The artificial intelligence-based electric wheelchair of claim 7, wherein the sensor includes a microphone, a camera, and a biometric sensor, the biometric sensor including at least one of a fingerprint sensor, an iris sensor, and a body pressure sensor, and wherein the electric wheelchair control device is configured to perform a user registration procedure in response to a user menu selection on the user interface screen, the user registration procedure comprising:
- extracting first characteristic data by recognizing the user's voice through the microphone;
- extracting second characteristic data by recognizing the user's iris from an image captured by the camera;
- extracting third characteristic data by recognizing the user's fingerprint through the fingerprint sensor;
- extracting fourth characteristic data by recognizing the user's face from an image captured by the camera;
- determining an authentication weight for each of the first to fourth characteristic data based on first to fourth templet data pre-learned corresponding to each of the first to fourth characteristic data, respectively; and
- determining an authentication level for the user based on the authentication weight determined for each of the first to fourth characteristic data, wherein the extracted first to fourth characteristic data and information on the determined authentication level are stored and managed in an internal memory, and the user authentication is performed according to the determined authentication level.

* * * * *